United States Patent [19]
Young

[11] Patent Number: 5,421,645
[45] Date of Patent: Jun. 6, 1995

[54] MODULAR COMPARTMENTS FOR UTILITY VEHICLE

[76] Inventor: Richard E. Young, 44 Lakeside Crescent, Lancaster, N.Y. 14086

[21] Appl. No.: 18,200

[22] Filed: Feb. 16, 1993

[51] Int. Cl.⁶ .......................................... A47B 87/00
[52] U.S. Cl. ................................ 312/108; 312/257.1; 296/37.6
[58] Field of Search .............. 312/108, 257.1, 263, 312/264, 265.5, 329; 296/37.1, 37.6

[56] References Cited

U.S. PATENT DOCUMENTS

| | | | |
|---|---|---|---|
| 2,722,352 | 11/1955 | Dehnel | 296/37.6 X |
| 3,544,185 | 12/1970 | Lundberg | 312/264 X |
| 3,836,218 | 9/1974 | Hallal | 312/257.1 X |
| 3,879,096 | 4/1975 | Blodee | 312/257.1 X |
| 4,126,349 | 11/1978 | Nelson et al. | 296/37.6 X |
| 4,171,150 | 10/1979 | Soderlund | 312/263 X |
| 5,039,177 | 8/1991 | Newell et al. | 312/263 X |
| 5,267,773 | 12/1993 | Kalis, Jr. et al. | 296/37.6 X |

Primary Examiner—Brian K. Green
Attorney, Agent, or Firm—Bean, Kauffman & Spencer

[57] ABSTRACT

Cabinets are formed with a first chamber defined by end joined lengths of a first extrusion, a first chamber outer end closure and a first chamber inner end closure, which may include a second chamber defined by end joined lengths of a second extrusion edge interfitted with lengths of the first extrusion. Two or more cabinets may be combined to form a module. In a preferred construction adapted for use in fabricating a utility vehicle, such as a fire truck, a module includes two or more cabinets removably joined to a common walkway arranged to bridge across the cabinets.

12 Claims, 6 Drawing Sheets

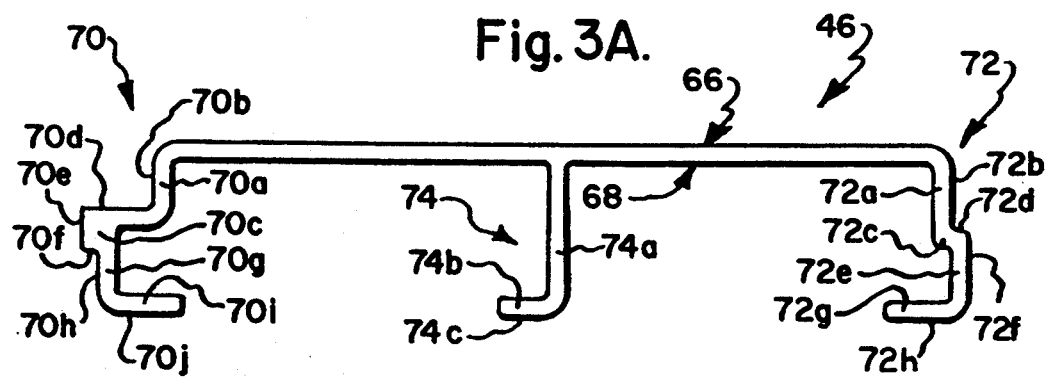
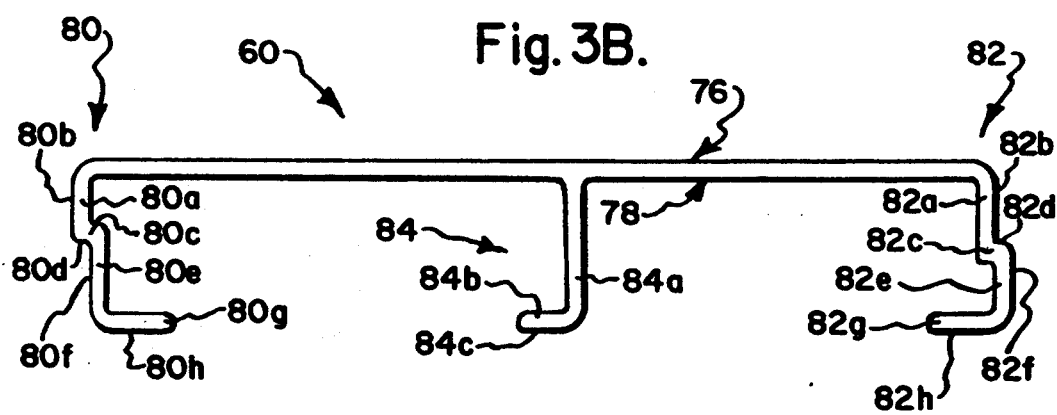
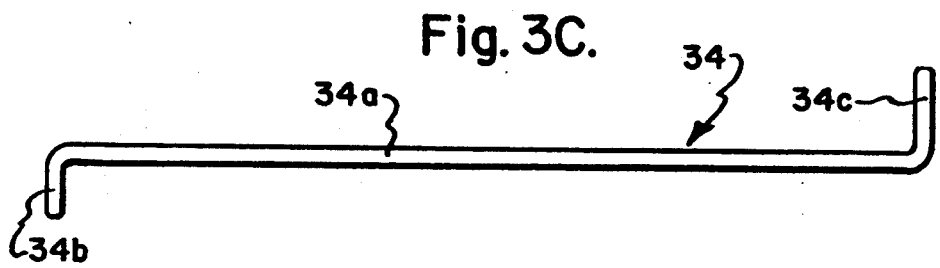
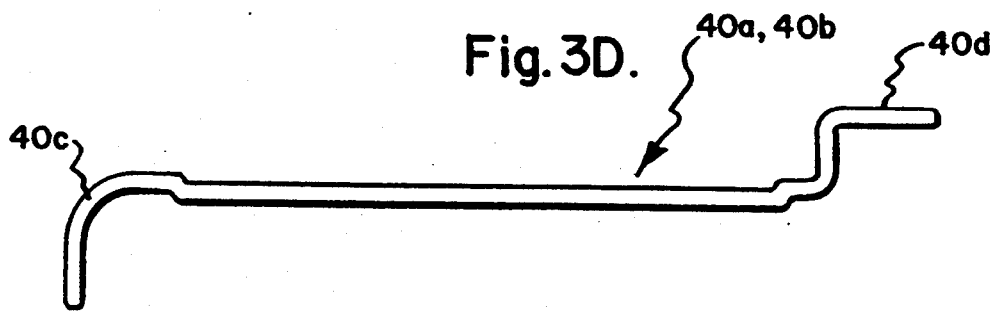

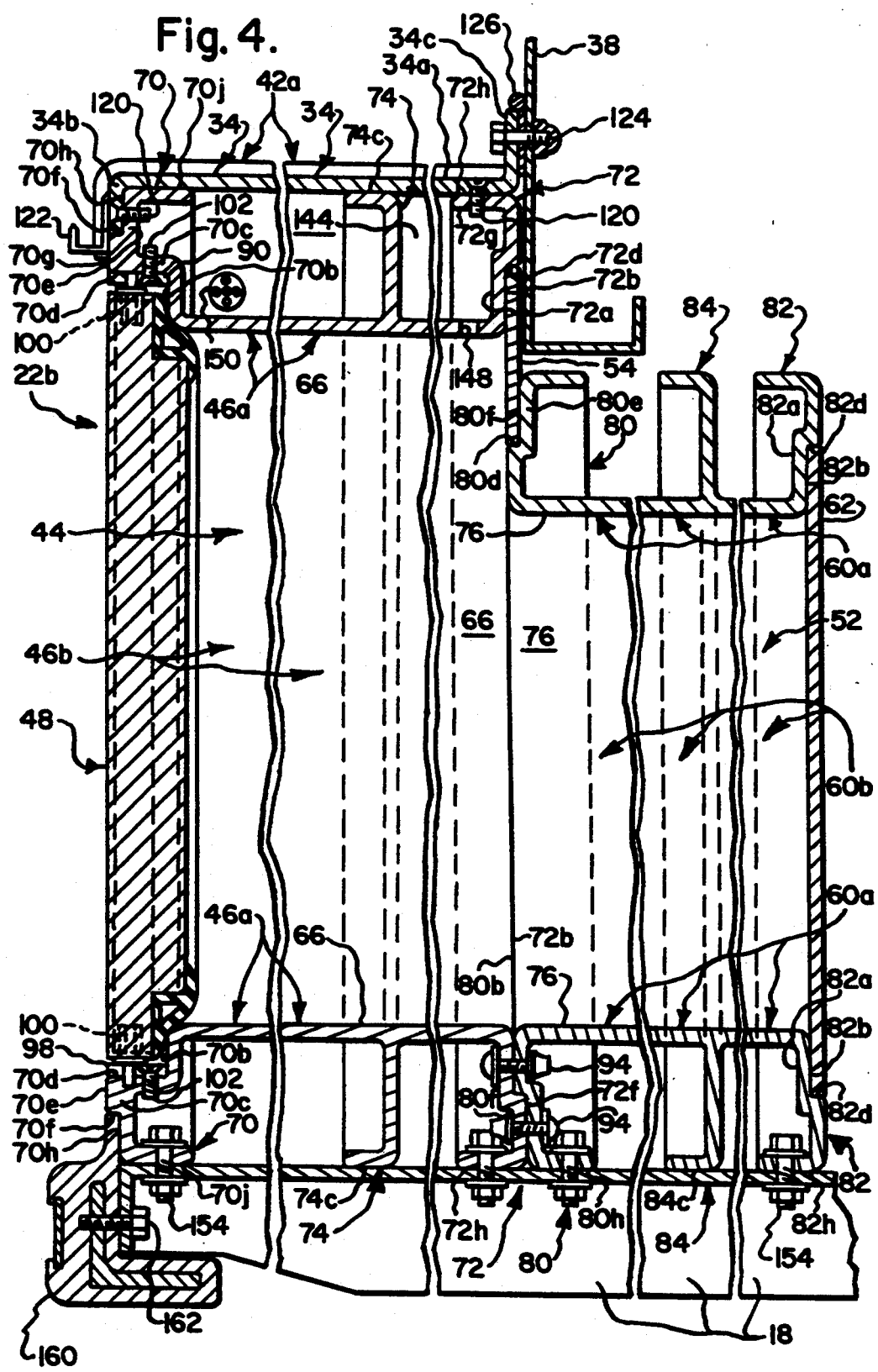

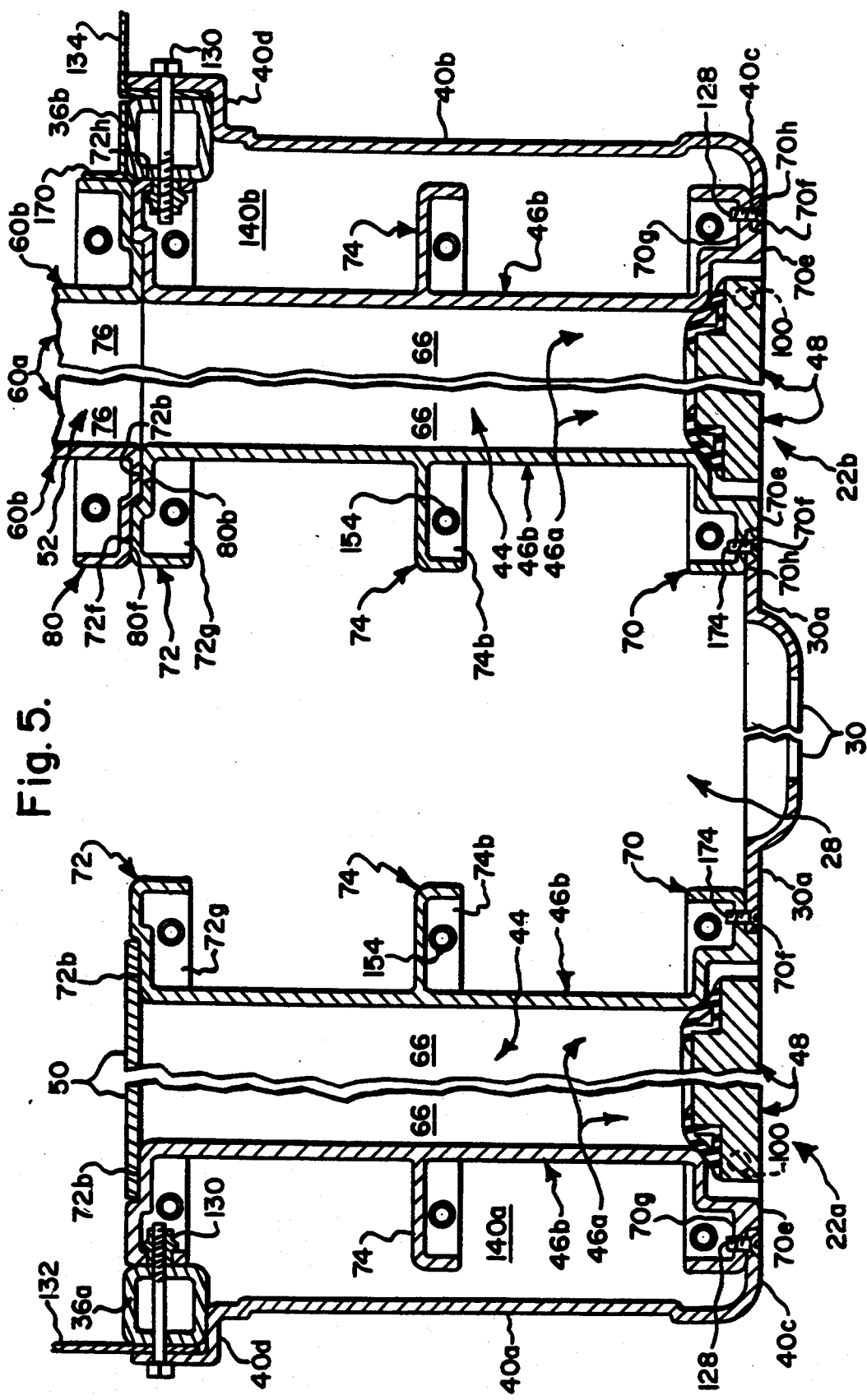

MODULAR COMPARTMENTS FOR UTILITY VEHICLE

BACKGROUND OF THE INVENTION

Utility vehicles typically are required to be provided with a number of storage cabinets accessible from the exterior of the vehicle. Such cabinets typically include a single chamber or storage compartment having its walls fabricated by attaching sheet metal to a suitable framework or by molding a suitable plastic material to form the walls as a one piece or integral unit.

Sheet metal cabinets are recognized as being undesirable from the standpoint of their cost of construction and their susceptibility to damage and corrosion. On the other hand, problems are encountered with molded plastic cabinets in regard to warpage and the requirement that their walls be reinforced subsequent to the molding operation when intended for heavy duty use environments. A further problem encountered with molded plastic cabinets is that a separate mold must be constructed each time it is desired to construct a cabinet of a different size or shape.

Moreover, prior cabinet construction techniques of which I am aware do not allow for the construction of modules including two or more cabinets which may be constructed separately from a vehicle and then installed thereon, and further allow individual cabinets damaged during use to be subsequently removed from their module and replaced without requiring removal of the whole of their module from the vehicle.

As a result of the disadvantages of prior cabinet constructions, utility vehicles requiring the provision of numerous cabinets of differing size and/or configuration, such as with the case of fire trucks, are quite expensive to manufacture and maintain when damaged during use.

SUMMARY OF THE INVENTION

The present invention is directed towards an improved cabinet construction and modules formed from two or more of such cabinets.

In accordance with the invention, a cabinet is formed with a first chamber defined by end joined lengths of a first extrusion, first chamber outer end closure for providing access to the first chamber and a first chamber inner end closure. The inner end closure may be a closure panel, a second chamber having a cross-sectional shape and size corresponding to that of the first chamber, or the combination of a closure panel and a second chamber of reduced size relative to the first chamber. The second chamber in turn has an inner end closure defined by a closure panel, one or more additional chambers or a combination of a closure panel and an additional chamber. The second and any additional chambers are defined by end joined lengths of a second extrusion having first and second edge portions, wherein the first edge portion is shaped for interfitting with an edge portion of a length of the first extrusion and the second edge portion is shaped for interfitting with the first edge portion of a length defining an adjacent additional chamber. The edge portions of the first and second extrusions are shaped to allow suitable removable fasteners, such as bolts, to be employed to join the first and second chambers of a cabinet in alignment, to join adjacent cabinets together and/or to additional structural members to fabricate a module having two or more cabinets, and to join an assembled cabinet or module to a desired portion of a utility vehicle, such as its frame. A cabinet may be subsequently removed for repair or replacement without need for removing any adjacent cabinet or the module from the vehicle.

The design of a module would of course be dependent upon the requirements of a utility vehicle with which it is to be employed. However, as by way of example, there will be described a module adapted for use in forming one side of the rear of a fire truck of the type required to have vehicle side opening cabinets disposed on opposite sides of a vehicle frame mounted water tank and a walkway extending lengthwise along each side of the vehicle. A similarly constructed module may be used to form an opposite side of the truck.

In the disclosed module construction, front and rear vehicle side opening cabinets and an upper centrally located vehicle side opening cabinet bound a vehicle wheel well; a walkway formed as an extrusion removably bridges across the cabinets and cooperates with top walls thereof to define upper passageways extending lengthwise of the module; vertically rising front and rear end panels formed as extrusions are removably joined to the forwardly and rearwardly facing walls of the front and rear cabinets and cooperate therewith to define vertically rising passageways having upper ends communicating with the upper passageways; front and rear corner castings cover the junctures of opposite ends of the walkway with the upper ends of the front and rear end panels; and front and rear vertically rising tubes are joined respectively to the front and rear end panels and front and rear cabinets and serve to mount an upper body panel, which is additionally fixed to the walkway and intended to conceal side walls of the water tank. The front, rear and centrally located cabinets would each include a first chamber, and one or both of the front and rear cabinets would additionally have a second chamber reduced in height, as required to permit same to project beneath the sides of the water tank in order to maximize space available for storage purposes.

The rear of the fire truck may be completed, as desired, such as by providing a vehicle rear opening cabinet of the general type described and a further walkway bridging across this cabinet and the second chambers of the rear cabinets of opposite truck side modules.

In the presently preferred construction, the extrusions employed to form the cabinets, the walkways, the front and rear end panels and the front and rear tubes are formed of glass fiber reinforced plastic material, whereby to provide for a strong, corrosion resistant construction. The adoption of extrusions for use in forming the main structural elements of the cabinets and modules is cost effective in that it allows a wide range of cabinet and module sizes and shapes to be fabricated by simply cutting required lengths from a relatively small number of extrusions.

BRIEF DESCRIPTION OF THE DRAWINGS

The nature and mode of operation of the present invention will now be more fully described in the following detailed description taken with the accompanying drawings wherein:

FIGS. 3A-3D are end views of extrusions used in forming the module;

FIG. 4 is an enlarged, fragmentary sectional view taken generally along the line 4—4 in FIG. 1;

FIG. 5 is an enlarged, fragmentary sectional view taken generally along the line 5—5 in FIG. 1;

DETAILED DESCRIPTION

Figure 1:
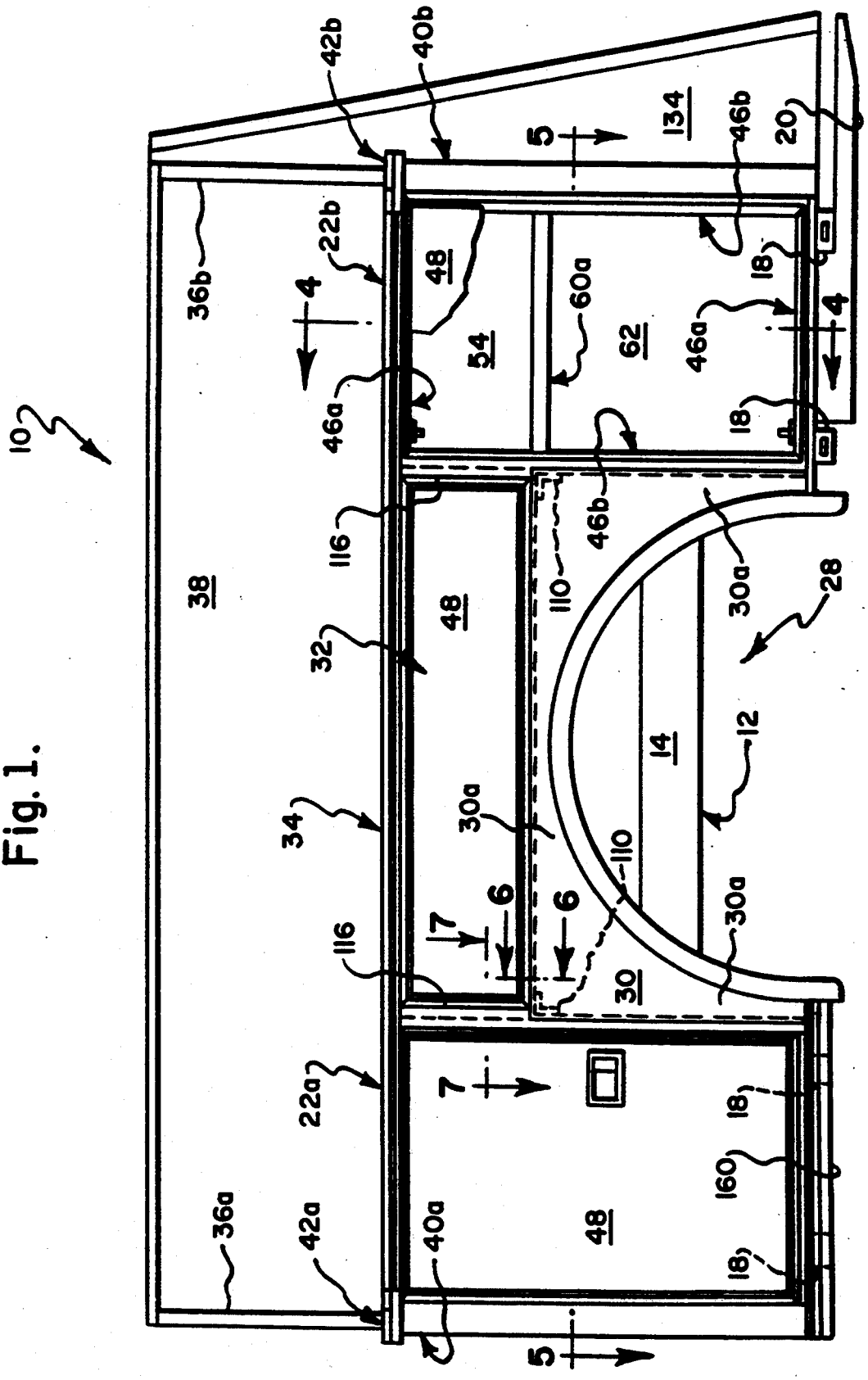
FIG. 1 is a side elevational view of a module formed in accordance with the invention mounted on the frame of a fire truck.
Figure 2:
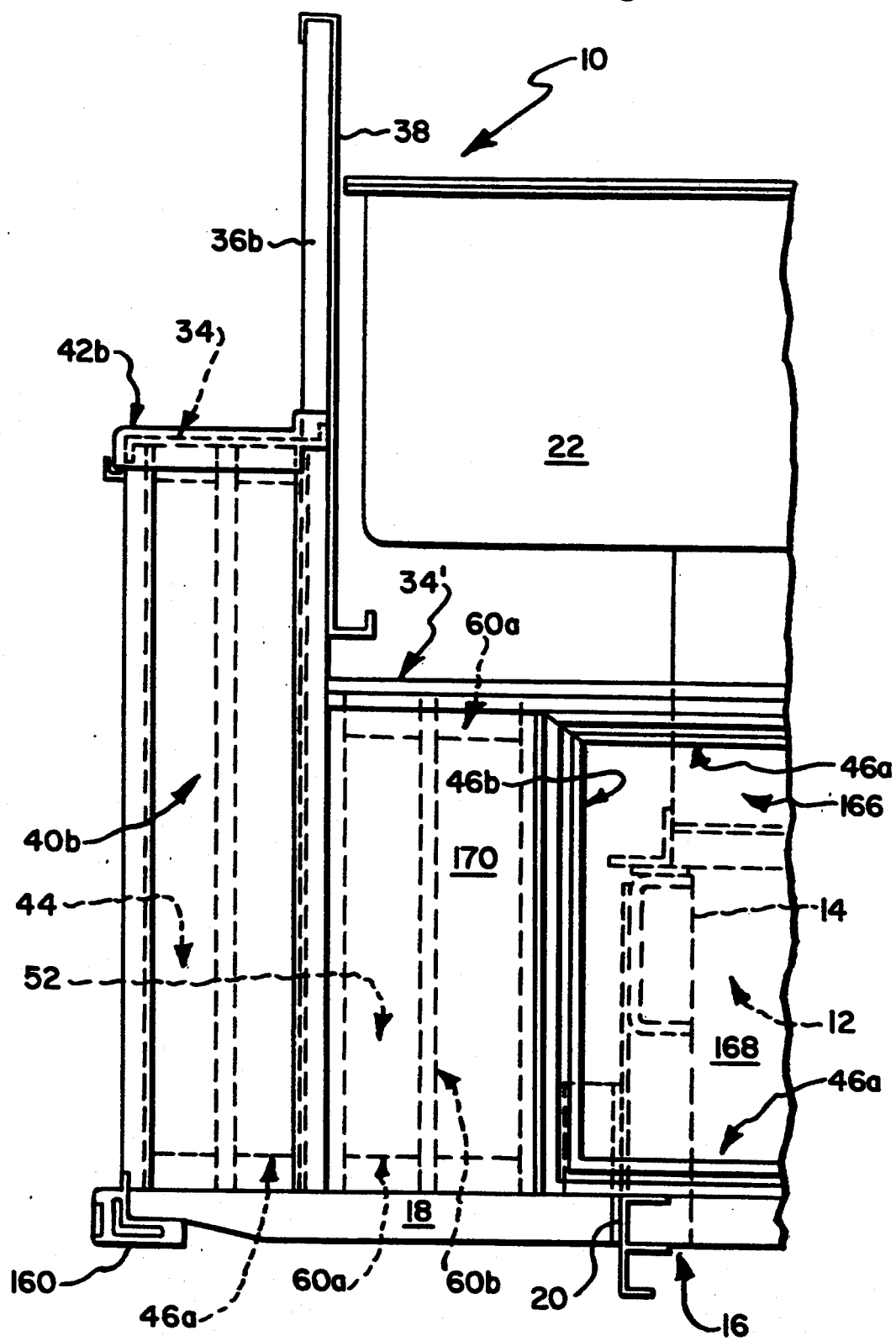
FIG. 2 is a partial rear end elevational view thereof.

A vehicle side mounted module formed in accordance with one form of the present invention is generally designated as 10 in FIGS. 1 and 2, and shown for purposes of illustration as being mounted on the frame 12 of a vehicle, such as a fire truck. It will be understood that in a typical fire truck installation, a pair of modules would be mounted one module on each side of the truck, with constructions of the individual modules being dependent on truck operating requirements.

Frame 12 may be of any suitable construction, but is disclosed, as by way of example, as including a pair of lengthwise extending main frame channels, only one of which is shown at 14 in FIGS. 1 and 2; and a subframe 16, which depends from the main channels and includes a plurality of transversely extending module mounting channels 18 and a pair of lengthwise extending, cantilever supported rear running board supporting channels, only one of which is shown at 20 in FIGS. 1 and 2. Frame 12 may mount a water reservoir or tank 22, when the vehicle is a pumper truck, and be in turn supported by wheels, not shown.

In the construction shown in FIGS. 1 and 2, module 10 generally includes a pair of main, vehicle side opening cabinets 22a, 22b, which cooperated to define front and rear sides of a vehicle wheel receiving well 28 partly covered with a removable fender panel 30; a centrally located upper cabinet 32 disposed above the wheel receiving well; a common walkway or cover plate 34 bridging across cabinets 22a, 32 and 22b; a pair of upstanding tubes 36a, 36b serving to mount an upper body panel 38 to upstand above the walkway for purposes of concealing the sides of water reservoir 22 upon mounting of the module on frame 12; front and rear end panels 40a, 40b; and front and rear corner castings 42a, 42b.

Cabinets 22a, 22b and 32 would preferably have in common a first or outer chamber 44 defined by four end joined lengths cut from a first chamber wall defining extrusion 46 shown in end view in FIG. 3A; a first chamber outer end closure typically in the form of a hinge mounted access door 48; and a first chamber inner end closure, which may be variously defined depending on module installation requirements. As by way of example, the first chamber inner end closure may be in the form of a single closure panel 50, as shown for the case of cabinet 22a in FIG. 5; the combination of a reduced size, second or inner chamber 52 and closure panel 54, as shown for the case of cabinet 22b in FIG. 4, or a full size second or inner chamber 56, as shown for example in FIG. 9. Second chambers 52 and 56 are similar from the standpoint that they are defined by four end joined lengths cut from a second chamber wall defining extrusion 60 shown in end view in FIG. 3B, and by a second chamber inner end closure, which may be variously defined, such as a closure panel 62, as shown for the case of second chamber 52 in FIG. 4, or by successively joined like second chambers, not shown.

Now referring particularly to FIGS. 3A, 4 and 5, it will be understood that first chamber wall defining extrusion 46 has first and second oppositely facing elongated surface portions 66 and 68, respectively, which are employed to define inwardly and outwardly facing surfaces of chamber 44 and are lengthwise bounded by first or outer and second or inner edge portions 70 and 72, respectively. First edge portion 70 is defined by a first part or flange 70a upstanding from second surface portion 68 and defining a first surface 70b facing transversely outwardly of extrusion 46; a second part or flange 70c joined to the first part and defining a second surface 70d inner edge joined to the first surface and facing generally towards the second surface portion, a third surface 70e edge joined to an outer edge of the second surface and facing transversely outwardly of the extrusion, and a fourth surface 70f having an outer edge joined to the third surface and facing generally away from the second surface portion; and a third part or flange 70g joined to the second part and defining a fifth surface 70h edge joined to an inner edge of the fourth surface and facing transversely outwardly of the extrusion.

Second edge portion 72 is defined by a fourth part or flange 72a, which is arranged to upstand from second surface portion 68 and define a sixth surface 72b facing transversely outwardly of extrusion 46; a fifth part or flange 72c joined to the fourth part and defining a seventh surface 72d having an inner edge joined to the sixth surface and arranged to face generally towards the second surface portion; and a sixth part or flange 72e joined to the fifth part and defining an eighth surface 72f edge joined to an outer edge of the seventh surface and arranged to face transversely outwardly of the extrusion.

Preferably, first edge portion 70 of extrusion 46 additionally includes a seventh part or mounting flange 70i joined to third part 70g and serving to define a ninth surface 70j having and outer edge joined to surface 70h and arranged to face generally away from second surface portion 68; and second edge portion 72 additionally includes an eighth part or mounting flange 72g joined to sixth part 72e and defining a tenth surface 72h having an outer edge joined to surface 72f and arranged to face generally away from the second surface portion and be disposed essentially coplanar with ninth surface 70j and parallel to first surface portion 66 and second surface portion 68. Further, extrusion 46 preferably includes a reinforcing flange portion 74, which is arranged intermediate first edge portion 70 and second edge portion 72 and provided with a ninth part or flange 74a upstanding from second surface portion 68 and a tenth part or mounting flange 74b joined to the ninth part and defining an eleventh surface 74c facing generally away from the second surface portion and disposed to lie essentially coplanar with ninth surface 70j and tenth surface 72h.

In FIGS. 3B, 4 and 5, second chamber wall defining extrusion 60 is shown as having first and second oppositely facing elongated surface portions 76 and 78, respectively, which are employed to define inwardly and outwardly facing surfaces of chambers 52 or 56 and are lengthwise bounded by first or outer and second or inner edge portions 80 and 82, respectively. First edge portion 80 is defined by a first part or flange 80a upstanding from second surface portion 78 and define a first surface 80b facing transversely outwardly of extrusion 60; a second part or flange 80c joined to the first part and defining a second surface edge 80d having an outer edge joined to the first surface and facing generally away from second surface portion 78; and a third part or flange 80e joined to the second part and defining a third surface 80f edge joined to an inner edge of the second surface and facing generally outwardly of the extrusion.

Second edge portion 82 is defined by a fourth part or flange 82a upstanding from second surface portion 78 and defining a fourth surface 82a facing generally transversely outwardly of extrusion 60; a fifth part or flange 82c joined to the fourth part and defining a fifth surface 82d having an inner edge joined to the fourth surface and facing generally towards the second surface portion; and a sixth part or flange 82e joined to the fifth part and defining a sixth surface 82f edge joined to an outer edge of the fourth surface and facing generally transversely outwardly of the extrusion.

Preferably, first edge portion 80 of extrusion 60 additionally includes a seventh part or mounting flange 80g joined to third flange 80e and serving to define a seventh surface 80h edge joined at its outer edge to third surface 80f and arranged to face generally away from second surface portion 78; and second edge portion 82 additionally includes an eighth part or mounting flange 82g joined to sixth flange 82e and serving to define an eighth surface 82h edge joined at its outer edge to sixth surface 82f and arranged to face generally away the second surface portion and be disposed essentially coplanar with seventh surface 80h and parallel to first surface portion 76 and second surface portion 78. Further, extrusion 60 preferably includes a reinforcing flange 84, which is arrange intermediate first edge portion 80 and second edge portion 82 and provided with a ninth part or flange 84a upstanding from second surface portion 78 and a tenth part or mounting flange 84b joined to the ninth part and defining a ninth surface 84c facing generally away from second surface portion 78 and disposed to lie essentially coplanar with seventh surface 80h and eighth surface 82h.

In accordance with the present invention, the thickness of extrusion 46, as measured between first surface portion 66 and surfaces 70j, 74c and 72h, is preferably essentially equal to the thickness of extrusion 60, as measured between first surface portion 76 and surfaces 80h, 84c and 82h. Further, the width of surface 72b of extrusion 46, as measured between first surface portion 66 and surface 72d is preferably essentially equal to the width of surface 80b of extrusion 60, as measured between first surface portion 76 and surface 80d; the width of surface 72d of extrusion 46, as measured between surfaces 72b and 72f, is preferably essentially equal to the width of surface 80d of extrusion 60, as measured between surfaces 80b and 80f; and the width of surface 72f of extrusion 46, as measured between surfaces 72d and 72h, is preferably essentially equal to the width of surface 80f of extrusion 60, as measured between surfaces 80d and 80h. Moreover, the thickness of closure panel 54, and preferably also the thicknesses of closure panels 50 and 62, are essentially equal to the widths of surfaces 72d, 80d and 82d. With this construction, edge portion 72 of extrusion 46 may be arranged in face-to-face abutting engagement with edge portion 80 of extrusion 60 with inner surface portion 66 lying coplanar with inner surface portion 76, and surfaces 70j, 74c and 72h lying coplanar with surfaces 80h, 84c and 82h. It is also preferable that edge portion 82 of extrusion 60 is formed as a mirror image of edge portion 80 in order to permit these edge portions of adjacent extrusions 60 to be disposed in face-to-face abutting engagement with their associated inner surface portions 76 being disposed in coplanar relationship thereby to permit successive second chambers 52 or 56 to be joined as required to provide a cabinet of desired depth.

Figure 8:
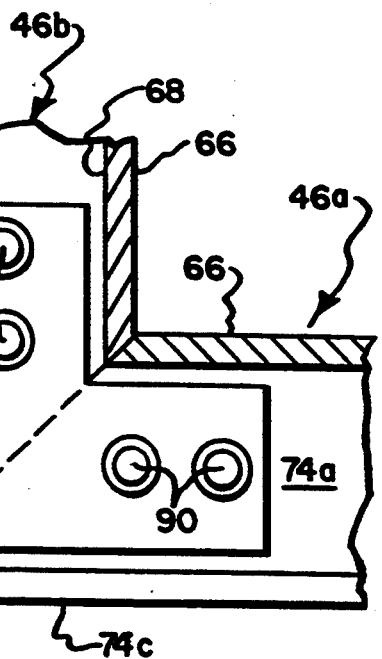
FIG. 8 is an enlarged, fragmentary view showing a corner joint of a cabinet.

Each first chamber 44 is preferably fabricated by cutting four lengths from extrusion 46, such that the lengths include a first pair of like size lengths 46a, 46a intended to form top and bottom walls of the first chamber and a second pair of like size lengths 46b, 46b intended to form the opposite side or vertical walls of the first chamber, wherein the ends of the lengths are cut at a 45° C. angle to allow the first surface portions 66 of adjacent lengths 46a and 46b to be disposed in a right angular relationship, as best shown in FIGS. 1 and 8. The ends of adjacent lengths 46a and 46b may be joined in any suitable manner, such as by means of L-shaped mounting brackets 88 and bolts 90 shown in FIG. 8 as being employed to clamp such brackets to reinforcing flange parts 74a, and/or by a suitable adhesive. Similar mounting brackets and bolts, and/or adhesive, may also be employed to join the respective end portions 70 and 72 of adjacent lengths 46a and 46b.

Each second chamber 52 or 56 is preferably fabricated in a manner identical to that described with reference to first chamber 44, such that the second chamber is defined by a first pair of like size lengths 60a, 60a forming its top and bottom walls and a second pair of like size lengths 60b, 60b forming its opposite side walls.

Figure 9:
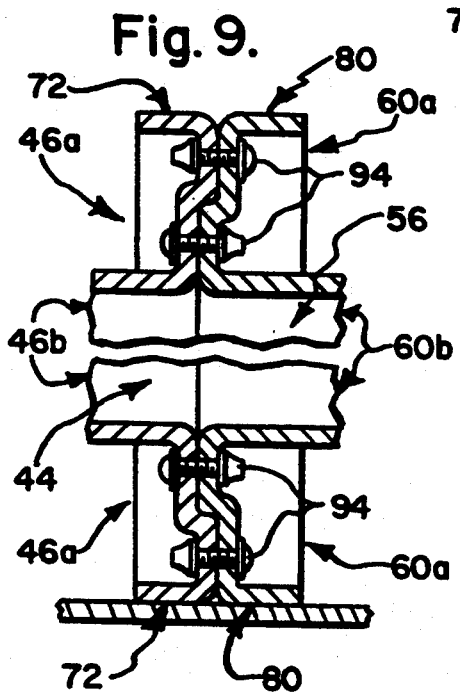
FIG. 9 is an enlarged, fragmentary view similar to FIG. 4, but showing an alternative module construction employing inner and outer cabinet chambers of the same height.

Aligned or end connected chambers 44 and 52 or 44 and 56 or 52 and 52 may be joined to one another to create a cabinet of desired depth by suitable means, such as bolts 94 shown for example in FIGS. 4 and 9 as extending through the engaged end portions 72 and 80 of lengths 46a, 46b and 60a, 60b, respectively. Closure panel 54 may be suitably secured to surfaces 72b and 80f of extrusion end portions 72 and 80, respectively, by adhesive and/or by mechanical fasteners, as desired. In like manner, panel 50 may be secured to surfaces 72b of cabinet 22a, as shown in FIG. 5, and panel 62 may be secured to surfaces 82b of cabinet 22b, as shown in FIG. 4. Individual cabinet assemblies may subsequently be completed by suitably mounting doors 48 for horizontally or vertically directed swinging movements, as desired. A presently preferred mounting arrangement is shown in FIG. 4, wherein plates 98 carrying hinge pins 100 are fixed to surfaces 70d, 70d of lengths 46a, 46a by threaded fasteners 102.

Figure 6:
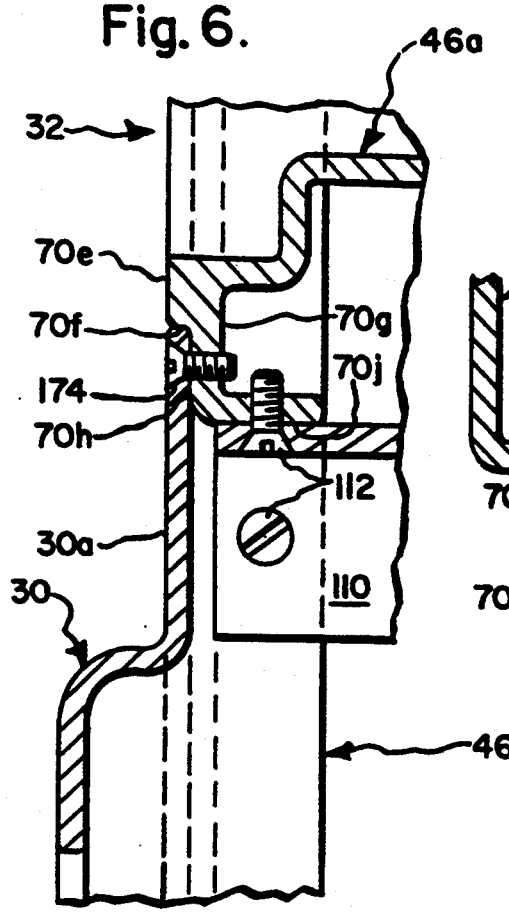
FIG. 6 is an enlarged, fragmentary sectional view taken generally along the line 6—6 in FIG. 1.
Figure 7:
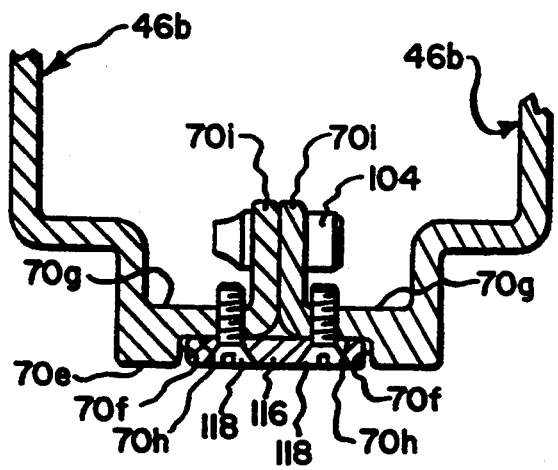
FIG. 7 is an enlarged, fragmentary sectional view taken generally along the line 7—7 in FIG. 1.

Adjacently disposed cabinets of each module 10 are preferably removably fixed to one another in order to allow cabinets, which are damaged during use, to be removed from module 10 for repair or replacement. A convenient arrangement is shown for example in FIG. 7, where bolts 104 are passed through parts 70i, 70i of side wall lengths 46b, 46b of cabinets 22a and 32. Parts 74b, 74b and 72g, 72g of side wall lengths 46b, 46b of cabinets 22a and 32 may be similarly joined; and if desired, bottom length 46a of cabinet 32 may be supported relative to an adjacent side wall length 46b of cabinet 22a by an angle extrusion 110 removably fixed thereto by bolts 112, as generally shown in FIG. 6. Cabinet 32 would be similarly removably attached to cabinet 22b. Further, it is preferable to cover the vertical joint between adjacent cabinets by decorative and/or reinforced strips 116 best shown in FIG. 7 as being removably affixed to parts 70g, 70g of side wall lengths 46b, 46b of cabinets 22a and 32 by means of bolts 118.

Cabinets 22a, 32 and 22b may also be removably connected to one another by walkway or cover plate 34, which is lengthwise sized to bridge across these cabinets, as best shown in FIG. 1, and be suitably removably fixed to their top wall lengths 46a, such as by threaded fasteners 120 extending through a walkway thread portion 34a into parts 72g and through a walkway first edge portion 34b into parts 70g, as best shown in FIG. 4. Preferably, as shown in FIG. 4, the widthwise dimension, of walkway 34, as measured between its first and second edge portions 34b and 34c, corresponds to the widthwise dimension of extrusion 46, and first edge portion 34b is sized to essentially conform to surfaces 70f and 70h, and to lie essentially flush with surface 70e. If desired, a drip edge 122 may be suitably removably affixed to first edge portion 34b to bridge downwardly across the joint it forms with top wall lengths 46a of cabinets 22a, 34 and 22b.

Walkway second edge portion 34c is preferably removably fixed to upper body panel 38 by bolts 124 with a suitable sealing strip 126 being clamped between the walkway and the upper body panel as shown in FIG. 4.

As shown in FIG. 5, threaded fasteners 128 may be employed to removably join first edge portions 40c of front and rear panels 40a and 40b to parts 70g of the foremost and rearmost side wall lengths 46b, 46b of cabinets 22a and 22b; and bolts 130 may be employed to removably join second edge portions 40d of the front and rear panels and the foremost and rearmost side wall lengths of cabinet 22a and 22b to tubes 36a and 36b. Bolts 130 may be mounted subsequent to mounting of module 10 on frame 12 to allow for subsequent attachment of a transversely extending tank front shielding panel 132 shown only in FIG. 5, and rear safety panels 134 shown in FIGS. 1 and 5. Preferably, first edge portions 40c are sized to lie essentially flush with surfaces 70e and to engage with surfaces 70f when same are affixed to parts 70g by fasteners 128.

Front and rear corner castings 42a and 42b are sized and shaped to overlie the front and rear ends of walkway 34 and bridge downwardly across the upper ends of front and rear end panels 40a and 40b, so as to provide a cover for upper ends of vertically extending front and rear passageways or channels 140a and 140b, which are bounded by the front and rear end panels and the forward and rearmost side wall lengths 46b, 46b of cabinets 22a and 22b, as shown in FIG. 5. Corner castings 42a and 42b may be suitably, removably fixed to opposite ends of walkway 34 and the upper ends of end panels 40a and 40b by threaded fasteners, not shown.

End passageways 140a and 140b have their lower ends left open to the atmosphere and their upper ends arranged in flow communication with forward and rearmost ends of horizontally extending passageways or channels 144 shown in FIG. 4 as being defined by walkway tread portion 34a and top wall lengths of 46a of cabinets 22a, 32 and 22b. This arrangement is desirable in that it allows the interiors of the cabinets to be vented to the atmosphere via flow paths defined by vent openings 148 provided in the top wall lengths 46a of the cabinets, passageways 144 and passageways 140a and 140b. Passageways 140a, 140b and 144 also provide a convenient moisture free path for electrical cables 150, shown only in FIG. 4, which may extend between the front and rear ends of module 10, and if desired, be fed through apertures, not shown, into the individual cabinets.

If desired, single end cabinets 22a and/or 22b may be replaced by two or more vertically stacked cabinets or horizontally adjacent cabinets, and central cabinet 32 may be dispensed with or replaced by two or more vertically stacked or horizontally adjacent cabinets.

After assembly of module 10, it may be removably fixed to frame 12 by bolts 154 extending downwardly through selected ones of mounting flanges 70i, 74b, 72g, 80g, 84b and 82g of bottom wall lengths 46a and 60a of cabinets 22a and 22b into transversely extending mounting channels 18, as generally shown in FIG. 4. After mounting of the module, decorative side bumper strips 160 may be removably fixed by bolts 162 to the ends of mounting channels 18, as best shown in FIG. 4.

The invention additionally contemplates the provision of an additional cabinet 166, which is removably bolt affixed to subframe 16 intermediate second chambers 52 of the rear cabinets 22b of the modules mounted adjacent opposite sides of the vehicle, and fitted with a rearwardly opening closure door 168, as shown in FIG. 2. Cabinet 166 may be formed with only a first or outer chamber formed from lengths 46a and 46b, as is the case with cabinet 22a, or both first and second or inner chambers, as shown in FIG. 9. In either event, the exterior height of cabinet 166 preferably corresponds to the exterior height of second chambers 52, so as to allow a second walkway 34' to be removably bolt affixed to the top wall lengths 60a of chambers 52 of the bounding or side modules and the top wall length 46a of cabinet 166. Preferably, a rear covering panel 170, shown in FIGS. 2 and 5, would be provided to cover the outer surface of side wall length 60b of each of chambers 52, and this panel may be removably bolt affixed, as desired, to side wall length 46b of cabinet 166, side wall length 60b of chamber 52 and tube 36b. Further, it may be desirable to provide an upper rear panel, not shown, which extends vertically upwardly from adjacent the front edge of walkway 34' for purposes of shielding the rear of tank 22 from view.

As desired, the vertically extending and upper edges 30a of fender panel 30 may be removably fixed by bolts 174 to surfaces 70h of side wall lengths 46b of cabinets 22a and 22b and bottom wall length 46a of cabinet 32, either before or after mounting of module 10 on subframe 16. Preferably, fender panel 30 is sized to permit side and upper edges 30a to essentially engage with surfaces 70f of side wall lengths 46b and bottom wall length 46a bounding wheel well 28 and such edges provided with a thickness essentially corresponding to the width of surfaces 70f, as best shown in FIGS. 5 and 6.

It will be understood that the number, shape, size and relative depth of cabinets employed, and whether same are arranged singularly, stacked, or side by side in a given module, will be determined by module installation requirements. Moreover, the type of elements, i.e., end panels, walkways, etc., if any, joined to the cabinets to complete a module will in like manner be determined by installation requirements. It will also be understood that when a cabinet is formed with a second chamber whose cross-sectional size is smaller than its first chamber, the second chamber may, rather than being stepped down, as disclosed for the case of cabinet 22b, be stepped up, or stepped horizontally.

In the presently preferred construction, the extrusions employed to form the cabinets, the walkways, the front and rear end panels and the front and rear tubes are formed of glass fiber reinforced plastic material, whereby to provide for a strong, corrosion resistant construction. It is also preferable to form the cabinet closure panels and any additional panel used in fabricating a module from suitable plastic sheet material and to cast the front and rear corner castings from plastic material. The doors or closures are preferably fabricated by bonding plastic sheet material to the surfaces of a suitable rigidifying core material.

What is claimed is:

1. A cabinet comprising:

first chamber defined by four end joined first lengths of a first extrusion having first and second oppositely facing elongated surface portions for use in defining inwardly and outwardly facing surfaces of said chamber, respectively, and being bounded along opposite lengthwise extending edges thereof by first and second edge portions, said first edge portion having a first part upstanding from said second surface portion and defining a first surface facing away from said second edge portion, a second part joined to said first part and defining second, third and fourth surfaces, said second surface having an inner edge joining said first surface and facing generally towards said second surface portion, said third surface edge joining an outer edge of said second surface and facing away from said second edge portion, said fourth surface having an outer edge joining said third surface and facing generally away from said second surface portion, and a third part joined to said second part and defining a fifth surface edge joining an inner edge of said fourth surface and facing away from said second edge portion, and said second edge portion defining a fourth part upstanding from said second surface portion and defining a sixth surface facing away from said first edge portion, a fifth part joined to said fourth part and defining a seventh surface having an inner edge joined to said sixth surface and facing generally towards said second surface portion, and a sixth part joined to said fifth part and defining an eighth surface edge joined to an outer edge of said seventh surface and facing away from said first edge portion;

an outer end closure mounted on said first edge portions for affording access to said first chamber; and an inner end closure for said first chamber mounted on said second edge portions.

2. A cabinet according to claim 1, wherein said inner end closure is a panel peripherally joined to said sixth surface of each of said lengths of said first extrusion.

3. A cabinet according to claim 1, wherein said inner end closure includes a second chamber defined by four end joined lengths of a second extrusion and a second inner end closure, said second extrusion comprising:

first and second oppositely facing elongated surface portions for use in defining inwardly and outwardly facing surfaces of said chamber, respectively, and being bounded along opposite lengthwise extending edges thereof by first and second edge portions, said first edge portion of said second extrusion having a first part upstanding from said second second surface portion of said second extrusion and defining a first surface facing away from said second edge portion of said second a second part joined to said first part and defining a second surface having an outer edge joining said first surface and facing generally away from said second surface portion of said second extrusion, and a third part joined to said second part and defining a third surface edge joining an inner edge of said second surface and facing away from said second edge portion of said second extrusion, and said second edge portion of said second extrusion having a fourth part upstanding from said second surface portion of said second extrusion and defining a fourth surface facing away from said first edge portion of said second extrusion, a fifth part joined to said fourth part and defining a fifth surface having an inner edge joining said fourth surface and facing generally towards said second surface portion of said second extrusion, and sixth part joined to said fifth part and defining a sixth surface edge joining an outer edge of said fifth surface and facing away from said first edge portion of said second extrusion, said second and third surfaces of said second extrusion abutting against said sixth and eighth surfaces of said first extrusion, respectively, with said inner surface portions of said first and second extrusions being disposed in alignment, and said second inner end closure being joined to said second portion of said second extrusion.

4. A cabinet according to claim 3, wherein said first edge portion of said first extrusion additionally includes a seventh part joined to said third part thereof and defining a ninth surface having an outer edge joining said fifth surface thereof and facing generally away from said second surface portion of said first extrusion, and said second edge portion of said first extrusion additionally includes an eighth part joined to said sixth part thereof defining a tenth surface having an outer edge joining said eighth surface thereof and facing generally away from said second surface portion of said first extrusion and lying essentially coplanar with said ninth surface, said first edge portion of said second extrusion additionally includes a seventh part joined to said third part thereof and defines a seventh surface having an outer edge joining said third surface thereof and facing generally away from said second surface portion of said second extrusion and said second edge part of said second extrusion additionally includes an eighth part joined to said sixth part thereof and defining an eighth surface having an outer edge joining said sixth surface thereof and facing generally away from said second surface portion of said second extrusion and lying essentially coplanar with said seventh surface thereof, and said seventh and eighth surfaces of said second extrusion lie essentially coplanar with said ninth and tenth surfaces of said first extrusion, respectively.

5. A cabinet according to claim 1, wherein said inner end closure includes a first closure panel, a second chamber defined by four end joined lengths of a second extrusion and a second inner end closure, said second extrusion comprising:

first and second oppositely facing elongated surface portions for use in defining inwardly and outwardly facing surfaces of said second chamber, respectively, and being bounded along opposite lengthwise extending edges thereof by first and second edge portions, said first edge portion of said second extrusion having a first part upstanding from said second surface portion of said second extrusion and defining a first surface facing away from said second edge portion of said second extrusion, a second part joined to said first part and defining a second surface having an outer edge joining said first surface and facing generally away from said second surface portion of said second extrusion, and a third part joined to said second part and defining a third surface edge joining an inner edge of said second surface and facing away from said second edge portion of said second extrusion, and said second edge portion of said second extrusion having a fourth part upstanding from said second surface portion of said second extrusion and defining a fourth surface facing away from said first edge portion of said second extrusion, a fifth part joined to said fourth part and defining a fifth surface having an inner edge joining said fourth surface and facing generally towards said second surface portion of said second extrusion, and a sixth part joined to said fifth part and defining a sixth surface edge joining an outer edge of said fifth surface and facing away from said first edge portion of said second extrusion, one pair of parallel ones of said lengths of said second extrusion are essentially equal in length to one pair of parallel ones of said lengths of said first extrusion, a second pair of parallel ones of said lengths of said second extrusion are shorter than a second pair of parallel ones of said lengths of said first extrusion, one length of said one pair of lengths of said second extrusion having said first edge portion thereof disposed in abutting engagement with said second edge portion of one length of said one pair of lengths of said first extrusion, an other of said one pair of lengths of said second extrusion being disposed intermediate and parallel to said lengths of said one pair of lengths of said first extrusion, said second pair of lengths of said second extrusion having said first edge portions thereof disposed in abutting engagement with said second edge portions of said second pair of parallel lengths of said first extrusion intermediate said one pair of lengths of said second extrusion, said first closure panel being disposed in abutting engagement with said third surface of said other of said one pair of lengths of said second extrusion, with said sixth surface of an other of said lengths of said one pair of lengths of said first extrusion and with said sixth surface of each length of said second pair of lengths of said first extrusion intermediate said other of said lengths of said one pair of lengths of said second extrusion and said other of said lengths of said one pair of lengths of said first extrusion, and said second inner end closure is joined to said second edge portion of said lengths of said second extrusion.

6. A cabinet according to claim 5, wherein said first edge portion of said first extrusion additionally includes a seventh part joined to said third part and defining a ninth surface having an outer edge joining said fifth surface and facing generally away from said second surface portion of said first extrusion, and said second edge portion of said first extrusion additionally includes and eighth part joined to said sixth part defining a tenth surface having an outer edge joining said eighth surface and facing generally away from said second surface portion of said first extrusion and lying essentially coplanar with said ninth surface, said first edge portion of said second extrusion additionally includes a seventh part joined to said third part and defines a seventh surface having an outer edge joining said third surface and facing generally away from said second surface portion of said second extrusion, and said second edge portion of said second extrusion additionally includes an eighth part joined to said sixth part and defining an eighth surface having an outer edge joining said sixth surface and facing generally away from said second surface portion of said second extrusion and lying essentially coplanar with said seventh surface, and said seventh and eighth surfaces of said one length of said one pair of lengths of said second extrusion and said second pair of lengths of said second extrusion being essentially coplanar with said ninth and tenth surfaces of said one length of said one pair of lengths of said first extrusion and said second pair of lengths of said first extrusion, respectively.

7. A cabinet comprising:
a first chamber of rectangular cross-section and having first and second ends defined by four end joined lengths of a first extrusion;
a second chamber of rectangular cross-section and having first and second ends defined by four end joined lengths of a second extrusion, said first end of said second chamber communicating with said second end of said first chamber the length of one pair of parallel lengths of said second extrusion being equal to the length of one pair of parallel lengths of said first extrusion, the length of a second pair of parallel lengths of said second extrusion being less than the length of a second pair of parallel lengths of said first extrusion, said lengths of said first and second extrusions each having first and second edge portions defining said first and second ends of said first and second chambers, respectively, one length of said one pair of lengths of said second extrusion having a first edge portion thereof joined in abutting engagement with said second edge portion of one length of said one pair of lengths of said first extrusion, an other length of said one pair of lengths of said second extrusion being disposed intermediate and parallel to said one pair of lengths of said first extrusion, said second pair of lengths of said second extrusion having said first edge portions thereof disposed in abutting engagement with said second edge portions of said second pair of lengths of said first extrusion intermediate said one pair of lengths of said second extrusion;
a panel joined to said first edge portion of said other length of said one pair of lengths of said second extrusion, to said second edge portion of another length of said one pair of lengths of said first extrusion and to said second edge portion of said second pairs of lengths of said first extrusion intermediate said other length of said one pair of lengths of said second extrusion and said other length of said one pair of lengths of said first extrusion; and
a closure for said second end of said second chamber.

8. A cabinet adapted for mounting on a frame of a vehicle, said cabinet comprising:
a first chamber defined by four end joined lengths of a first extrusion, said extrusion having first and second oppositely facing surface portions for defining inwardly and outwardly facing surfaces of said chamber, and first and second edge portions extending lengthwise of said surface portions for defining outer and inner ends of said chamber, respectively, said edge portions upstand from said second surface portion and provide means for mounting said first chamber on said frame; and a closure joined to said second edge portions for closing said inner end of said first chamber, said closure includes a second chamber defined by four end joined lengths of a second extrusion, said second extrusion having first and second oppositely facing surface portions defining inwardly and outwardly facing surfaces of said second chamber and first and second edge portions extending lengthwise of said surface portions of said second extrusion for defining outer and inner ends of said second chamber, said edge portions of said second extrusion upstand from said second surface portion thereof and provide means for mounting said second chamber on said frame, and means for joining said inner end of said first chamber to said outer end of said second chamber, said first surface portions of said lengths of said first extrusion and said first surface portions of said lengths of said second extrusion provide said first and second chambers with rectangular cross-sectional configurations and the cross-sectional size of said first chamber is greater than the cross-sectional size of said second chamber.

9. A cabinet according to claim 8, wherein said closure additionally includes a panel having oppositely facing surfaces thereof joined to a portion of said inner end of said first chamber and a portion of said outer end of said second chamber.

10. A module adapted for mounting on a frame of a vehicle to bound a well for a wheel thereof, said module comprising:

first and second cabinets each having a first chamber of rectangular cross-section with first and second ends defined by four end joined lengths of a first extrusion, said first extrusion having first and second surface portions for defining inner and outer surfaces of said cabinets and first and second edge portions for defining said first and second ends of said first chamber, said edge portions upstanding from said second surface portion and defining mounting flanges, said mounting flanges on a bottom one of said lengths of said first and second cabinets being essentially coplanar and defining means for mounting said module on said frame, said first and second cabinets being parallel and cooperating to horizontally bound said well; and a cover plate for bridging across said well and overlying a top one of said lengths of said first and second cabinets, said mounting flanges of said top one of said lengths of said first and second cabinets being essentially coplanar and joined to said cover plate, and said top one of said lengths cooperating with said cover plate to define horizontally extending passageways; and a third cabinet is provided and has a first chamber of rectangular cross-section with first and second ends defined by four end joined lengths of said first extrusion, said third cabinet being disposed intermediate said first and second cabinets, and mounting flanges of a top one of said lengths of said third cabinet are essentially coplanar with said mounting flanges of a top one of said lengths of said first and second chamber and joined to said cover plate to define horizontally extending passageways end connected to said passageways defined by said cover plate and said first and second cabinets.

11. A module according to claim 10, wherein vertically extending end panels are connected to mounting flanges of oppositely facing, vertically upstanding lengths of said first and second cabinets and cooperates therewith to define vertically extending passageways having upper ends arranged for communication with said horizontally extending passageways defined by said first and second cabinets and said cover plate.

12. A module according to claim 11, wherein corner means overlie the junctures of said vertically extending and horizontally extending passageways, and a wheel well cover panel has opposite vertically extending edges thereof connected to facing, vertically upstanding lengths of said first and second cabinets and an upper horizontally extending edge thereof connected to a bottom length of said third cabinet.

* * * * *